United States Patent
Pestoni et al.

(10) Patent No.: US 11,120,201 B2
(45) Date of Patent: Sep. 14, 2021

(54) AUTOMATED SUGGESTIONS IN CROSS-CONTEXT DIGITAL ITEM CONTAINERS AND COLLABORATION

(71) Applicants: ATLASSIAN PTY LTD, Sydney (AU); ATLASSIAN, INC., San Francisco, CA (US)

(72) Inventors: Florian Pestoni, Mountain View, CA (US); Balazs Nagy, San Jose, CA (US); Mark Roudebush, San Francisco, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/233,710

(22) Filed: Dec. 27, 2018

(65) Prior Publication Data
US 2020/0104351 A1    Apr. 2, 2020

Related U.S. Application Data

(60) Provisional application No. 62/737,561, filed on Sep. 27, 2018.

(51) Int. Cl.
*G06F 40/169* (2020.01)
*G06Q 10/10* (2012.01)
*G06K 9/00* (2006.01)
*G06F 40/197* (2020.01)

(52) U.S. Cl.
CPC .......... *G06F 40/169* (2020.01); *G06F 40/197* (2020.01); *G06K 9/00483* (2013.01); *G06Q 10/103* (2013.01)

(58) Field of Classification Search
None
See application file for complete search history.

(56) References Cited

U.S. PATENT DOCUMENTS

| | | | |
|---|---|---|---|
| 6,654,739 B1* | 11/2003 | Apte | G06F 16/355 |
| 10,540,404 B1* | 1/2020 | Dang | G06F 16/93 |
| 2004/0019846 A1* | 1/2004 | Castellani | G06Q 10/10 |
| | | | 715/229 |
| 2005/0060643 A1* | 3/2005 | Glass | G06F 40/169 |
| | | | 715/205 |

(Continued)

OTHER PUBLICATIONS

Bancu, Cristian, Monica Dagadita, Mihai Dascalu, Ciprian Dobre, Stefan Trausan-Matu, and Adina Magda Florea. "ARSYS—Article Recommender System." In 2012 14th International Symposium on Symbolic and Numeric Algorithms for Scientific Computing, pp. 349-355. IEEE, 2012. (Year: 2012).*

*Primary Examiner* — Frank D Mills
(74) *Attorney, Agent, or Firm* — Brownstein Hyatt Farber Schreck, LLP

(57) ABSTRACT

Techniques for automated suggestions for cross-context digital item containers and collaboration are provided, including analyzing digital items in each of multiple portfolios of digital items in order to determine similarities among the portfolios. The techniques proceed by determining similar portfolios for a first portfolio of digital items, and suggesting changes (e.g., additions, deletions, or alterations of digital items) based on differences between the first portfolio and the similar ones. Those changes can be accepted or rejected and applied to the first portfolio of digital items.

20 Claims, 7 Drawing Sheets

(56) References Cited

U.S. PATENT DOCUMENTS

2014/0108439 A1* 4/2014 Lamba .................. G06F 16/337
 707/758
2017/0269971 A1* 9/2017 Anya .................. G06Q 10/0633
2018/0300324 A1* 10/2018 Ziraknejad .............. G06F 15/76
2019/0392498 A1* 12/2019 Sarkar ................ G06Q 30/0631

* cited by examiner

100

| FIRST APPLICATION | DIGITAL PORTFOLIO APPLICATION | SECOND APPLICATION |
|---|---|---|
| Request to place item in digital portfolio 110 | Receive request 111 | |
| | Place digital copy of item in digital portfolio 120 | |
| | Receive request to view digital portfolio 130 | |
| | Display interactive view of digital portfolio 131 | |
| | Provide digital copy in response 150 | Request copy of the digital item in portfolio 140 |
| | | Receive requested digital copy for use 160 |

*FIG. 1*

AUTOMATED SUGGESTIONS IN CROSS-CONTEXT DIGITAL ITEM CONTAINERS AND COLLABORATION

BENEFIT CLAIM

This application claims the benefit under 35 U.S.C. § 119(e) of provisional application 62/737,561, filed Sep. 27, 2018, the entire contents of which is hereby incorporated by reference for all purposes as if fully set forth herein.

FIELD OF THE DISCLOSURE

One technical field of the present disclosure is computer-implemented collaborative information management systems, and more specifically, to cross-context digital item containers and collaboration.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Collaborative document creation, editing and management among distributed teams of workers continues to present challenges for efficient implementation in distributed computer systems and application programs. The problem has become more complex recently because more workers need to assemble a larger variety of data resources of different types to complete projects. For example, advancing a project could require marshaling electronic documents, images, spreadsheets, videos, source code files, database records, issue tracking records, chat conversations, transcripts of meetings conducted via video or online, and so forth. However, each of these data items may be stored in a different storage location and/or managed by a different application. Use of multiple different applications could be required merely to retrieve and view different data items.

Furthermore, when workers are organized into teams, a first team member may be unaware that a second team member digitally owns or controls other data items that the first team member may find useful or necessary for the project. Or, if the first team member is generally aware that the second team member has relevant data items, the first team member may not know how to obtain access to those data items, or may lack necessary permissions. Similarly, there may be other individuals in an enterprise who are not part of the team of the first team member, and/or unknown to the first team member, who have relevant data items.

One of the issues for users with respect to finding content is that each user must search for content in order to use that content. For example, if a user is searching for papers related to machine learning, that user will have to browse websites, blogs, news posts, etc., in order to find articles. This leads to a tremendous amount of work for the user, and no ability to easily get suggestions based on what the user has already found and collected, or based on similarity of previously-curated portfolios of documents.

SUMMARY

The appended claims may serve as a summary of the invention.

BRIEF DESCRIPTION OF THE DRAWINGS

In the drawings:

FIG. 1 is a flow diagram depicting a process for automated suggestions for cross-context digital item containers and collaboration.

DETAILED DESCRIPTION

Figure 2:
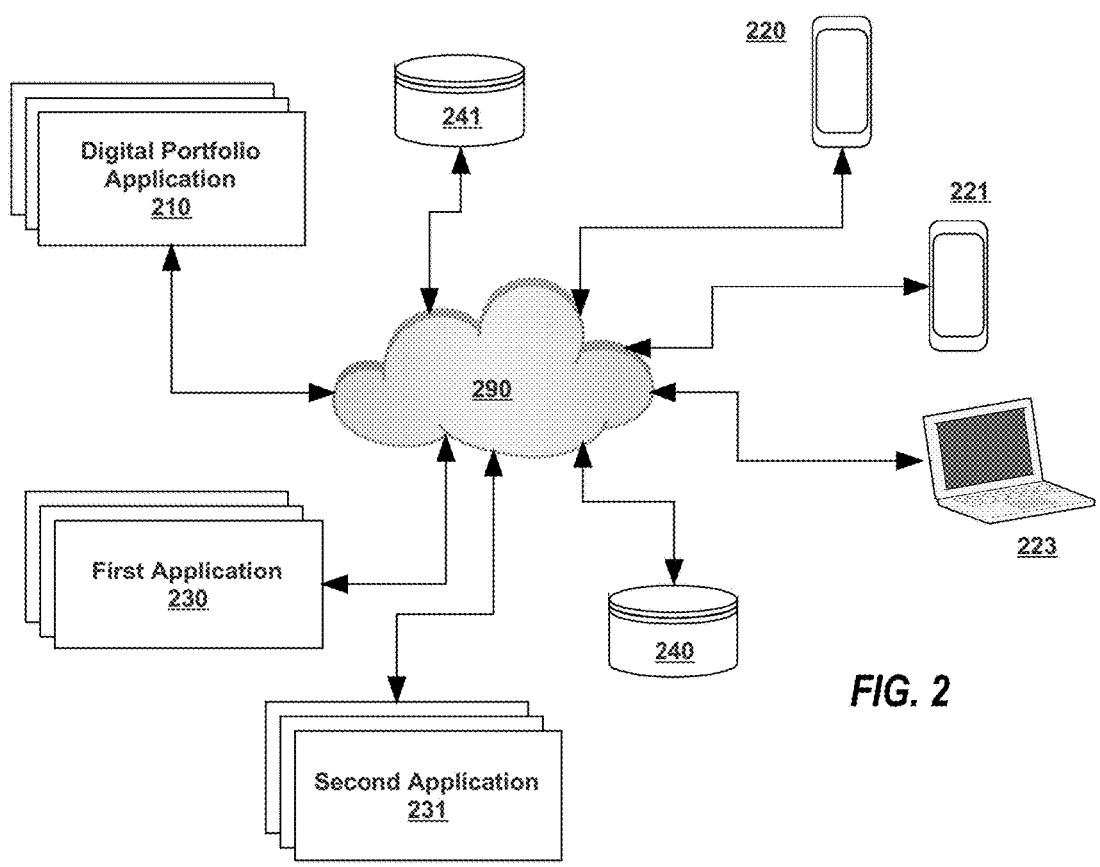
FIG. 2 is a block diagram depicting a system for automated suggestions for cross-context digital item containers and collaboration.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a computer system executes program instructions that implement a portfolio of digital items, sometimes called a data resource substrate or digital item container, that accommodates a plurality of data items of any of a plurality of different data types. The portfolio is addressable by application programs to transmit data items to the portfolio of digital items rather than to an e-mail inbox, chat room or other conventional destination. The portfolio of digital items is accessible and capable of rendering and display in response to calls from any application program that is executing in the computer system and that has been configured with a compatible interface to the portfolio.

In an embodiment, the instructions implementing the portfolio of digital items are programmed to automatically detect data items that are received in a conventional manner in a compatible application. For example, if an e-mail client program has been configured to connect to the portfolio, the instructions are programmed to automatically detect the arrival of an e-mail message that contains a file attachment and to copy the attached file to the portfolio of digital items. In some embodiments, the instructions are programmed to create a link to a file attachment on a file server, rather than a copy of the file, and to store the link in the portfolio.

Links may comprise references to file system locations, universal resource locators (URLs) that identify the location of data items in internal networks or public network locations or URIs. As another example, if an image file is pasted into a chat room discussion, the instructions implementing the portfolio are programmed to automatically detect the image file and to copy the image file, or a link to the image file, to a portfolio of digital items that is associated with a user or a team.

In an embodiment, the instructions implementing the portfolio of digital items are programmed to receive explicit addition of data items to the portfolio. For example, a file, link or other data item may be explicitly added to the portfolio using input operations in a graphical user interface by using a pointing device to drag and drop the file, link or other data item from one location, such as a file server folder or application program, over the interface for the portfolio of digital items and releasing the pointing device.

In another embodiment, the instructions implementing the portfolio of digital items are programmed as a bot (script, or other logic, etc.) that is integrated into a chat room application and has a discrete name or handle. In this embodiment, a data item may be explicitly added to a portfolio of digital items by mentioning the bot in the chat room. For example, assume that the portfolio bot has a name or handle of "@substrate" or "@palette", and a user creates a chat room post having the form "@palette" followed by pasting an image, and posting the post. In response, the instructions implementing the portfolio are programmed to listen to chat room posts that mention "@palette" and to respond by adding any file, link or other data item in an associated post to the posting user's portfolio.

In an embodiment, the instructions implementing the portfolio of digital items are programmed to share a portfolio of digital items with a second user or team member in response to input from a first user or team member. Sharing may be implemented programmatically in several ways. In one embodiment, sharing comprises accessing a sharing panel in a graphical user interface and adding a user identifier to a list of shared users. In another embodiment, sharing comprises selecting a sharing link or widget and entering a user identifier; in response, the instructions implementing the portfolio of digital items are programmed to transmit a sharing notification to a second user or team member. In an embodiment, the instructions implementing the portfolio of digital items are programmed to surface or display a notification to the second user or team member in an application that a computer of the second user or team member is executing.

In an embodiment, the instructions implementing the portfolio of digital items are programmed to receive modifications or updates to a portfolio of digital items and to transmit the modifications or updates to all other users of the same portfolio, or with whom the portfolio has been shared. In an embodiment, the functionality of the preceding sentence may be implemented by digitally storing a representation of each portfolio of digital items in a discrete location of a data repository, for which access is shared. For example, a relational database may store a portfolio table in which each discrete portfolio of digital items is a row having column values that correspond to attributes or metadata of the portfolio of digital items. In some embodiments, portfolio of digital items may be organized in team tables in which each discrete team of an entity accesses only a single database table, which stores all portfolio of digital items of all users of that team.

In some embodiments, digital items in each of multiple portfolios of digital items are analyzes. This analysis is used to determine similarities among the portfolios of digital items. These similarities are used to determine new digital items to suggest for inclusion in various other portfolios. When there are multiple suggested changes for a portfolio of digital items, those suggested changes may optionally be ranked so that they may be displayed in a ranked order for a user to accept or reject the various suggested items for inclusion in the portfolio of digital items. Ranking of the suggested changes are described elsewhere herein. When a suggested digital item is accepted for inclusion in a particular portfolio of digital items, it is added to that portfolio of digital items. Numerous details of the various aspects of the techniques are discussed herein.

As an example, there may be hundreds, thousands, tens of thousands, or even more portfolios of digital items stored on a digital portfolio system or set of systems, then similarity among those portfolios of digital items can be determined. As a more specific example, if a particular user is creating a portfolio of documents related to machine learning and it is determined that there are numerous similar portfolios of documents related to machine learning, then the system may suggest new documents that were not previously included in that first portfolio of digital items, but that were included in the other portfolios. The user may be presented a list of these documents in an inbox and may accept or reject any of the suggestions. In some embodiments, the program or application that manages the portfolio of digital items is called the digital portfolio application. The digital portfolio application may be implemented using object-oriented programming techniques in a multi-threaded environment. In such an implementation, programmatic objects that implement the portfolio of digital items and bots (scripts, other logic, etc.) are programmed to generate programmatic signals, such as events, method calls or invocations to other objects or methods that form part of the portfolio of digital items implementation. One result is that a particular action on a shared portfolio is immediately visible to all users who have access to the shared portfolio, and who are executing an application that is integrated to the portfolio system.

Example Processes

FIG. 1 is a flow diagram depicting a process for automated suggestions for cross-context digital item containers and collaboration. Generally, the techniques proceed by a first application requesting to place a digital item into a portfolio of digital items. This could be a request, for example, to place an image into the portfolio of digital items. The portfolio of digital items receives the request and then places a digital copy of the item (in this example, the image) in the portfolio of digital items. At some time later, the digital portfolio application receives a request to view the portfolio of digital items. The digital portfolio application then displays an interactive view of the portfolio of digital items. The interactive view of the portfolio of digital items may allow for one or more applications and/or user interactions to occur that will allow addition to the portfolio of digital items, copying from the portfolio of digital items, editing the portfolio of digital items, and the like. At some time later a second application may request a copy of a digital item in the portfolio of digital items. Based on this request for the copy of the digital item, the digital portfolio application may provide the digital copy in response to the request. The second application may then receive the requested digital copy for use in the second application. In the example above, the second application may request use of the image that was placed into the portfolio of digital items. The second application may then receive the image for use in the second application.

Figure 4:
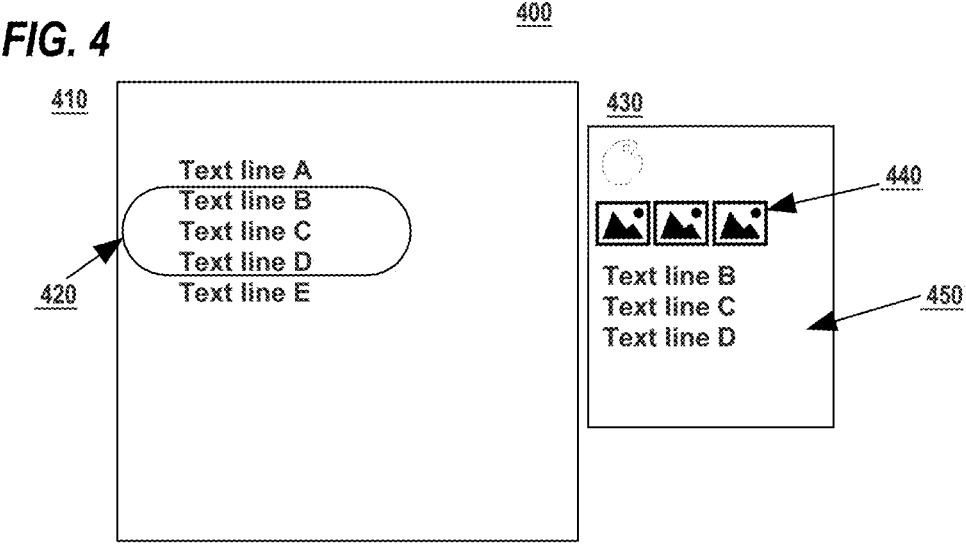
FIG. 4 depicts an example user interface for automated suggestions for cross-context digital item containers and collaboration.

Returning to the top of FIG. 1, the process 100 proceeds by first having a request 110 to place the digital item in the portfolio of digital items. This request to place a digital item into a portfolio of digital items can take many forms. For example, in some embodiments, the request to place a digital item in the portfolio of digital items may include a dragging motion on a user interface, for example from the first application to an interactive representation of the portfolio of digital items. This dragging motion may be interpreted as the request to place the digital item in the portfolio of digital items. Turning to FIG. 4, which shows an example user interface 400 for cross-platform digital item containers and collaboration, the first application 410 interface may allow for selection 420 of text lines B-D. This selected digital item (the text) may be dragged from the first application 410 to the interactive representation of the portfolio of digital items 430. The text lines B-D are then copied 450 into the portfolio of digital items 430. As depicted in FIG. 4, the portfolio of digital items 430 may also include other previously copied or pre-existing digital items, such as the images 440.

In some embodiments, receiving a request 110 to place an item in a digital portfolio may include receiving a digital mention to add the particular digital item to the portfolio of digital items. A digital mention may include, for example, an @ symbol before the word "palette" or another keyword as described elsewhere herein. This particular digital mention may be parsed and interpreted to add the information or digital items after the digital mention to the portfolio of digital items. In some embodiments, the digital mention may also include information for a second user account. In such embodiments, receiving the digital mention for the second user account may add the particular digital item to a second portfolio of digital items for the second user account. For example, if a user A puts in an @mention for user B's portfolio of digital items, then that @mention may add the digital item after the @mention to the portfolio of digital items for the second user account.

In some embodiments, in order to obtain the benefits of the techniques described herein, a user may have to provide access to allow certain or all other users to add items to their portfolio of digital items. In such embodiments, only after such permission has been given, may another user account add items to that portfolio of digital items that granted the access.

In some embodiments, an electronic mail that goes to a particular email address related to the portfolio of digital items may be used as the mechanism to request addition of digital items to a portfolio of digital items. For example, an email address of palette@domain.com may include one or more digital items and the sending of that email to the palette@domain.com may indicate that the digital items in the email should be added to the portfolio of digital items. In some embodiments, the address from which the email is sent may indicate which portfolio of digital items to add the contents of the email to. For example, if user A sends an email to palette@domain.com then the digital items in the email may be added to user A's palette.

After the first application requests 110 the placement of a digital item in the portfolio of digital items, the portfolio of digital items will receive 111 the request. The sending of the request and the receipt of the request may take many forms, including remote procedure calls, TCP/IP messages, UDP messages, email messages, SSL messages, HTTP(S) streams, API calls, and the like.

After receiving 111 the request, a digital copy of the item is placed in the portfolio of digital items. Placing 120 a digital copy of the item in the portfolio of digital items may include, creating a digital copy of the digital item and storing it in one or more memories. The portfolio of digital items may have a pointer to this memory or the memory may be associated with a portfolio of digital items.

In some embodiments, more than one user account may share the same portfolio of digital items. For example, user A and user B may both share a single portfolio of digital items. User A may request placement of items in that portfolio of digital items, and so may user B. User A and user B may also both request use of items in that portfolio of digital items. In some embodiments, relatedly, a user may share a duplicate copy of a portfolio of digital items with another user. For example, user A may share a portfolio of digital items with user B and user B may then have a separate copy of that portfolio of digital items. Then, when user B modifies the portfolio of digital items, user B's copy of the portfolio of digital items will be modified, but user A's copy will not be modified because the two are logically separate digital copies of digital portfolios of items.

After the digital copy of the item is placed 120 in the portfolio of digital items, and at some later time, a request may be received to view the portfolio of digital items. For example, the digital portfolio application may receive 130 a request to view the portfolio of digital items from the second application. Receiving 130 the request to view the portfolio of digital items may take many forms, such as a remote procedure call, an API call, a communication over TCP/IP, SSL, UDP, HTTP(S), double-clicking on an icon on a computer or phone screen, and the like. After receiving 130 the request to view the portfolio of digital items, the digital portfolio application may display 131 an interactive view of the portfolio of digital items. The interactive view of the portfolio of digital items may take many forms, including an interface window on a computing device interface that allows for the types of interactions enabling user interaction techniques to cause additions to, or copies from, the portfolio of digital items. For example, the interactive view of the portfolio of digital items may allow for selection of items in the portfolio of digital items and dragging those items to another application, such as the first application or the second application. Examples of interactive user interfaces for viewing the portfolio of digital items are given in interface 400 of FIG. 4, interface 500 of FIG. 5, interface 600 of FIG. 6, and interface 700 of FIG. 7.

In some embodiments, not depicted in FIG. 1, the digital portfolio application may include one or more filters for the portfolio of digital items. If a user account selects a particular filter, then only information or digital items related to or satisfying those filters may be shown in the portfolio of digital items. For example, a filter may indicate that the user account only wants to see digital items that are or contain text. Selecting such a filter would only show text items from the portfolio of digital items when displaying 131 the interactive view of the portfolio of digital items. Other filters may include, date and/or time when the digital item was added (or created, modified, etc.), identity of the user account associated with the addition of the digital item to the portfolio of digital items, size of digital item, and the like.

The second application may request 140 a copy of the digital item from the portfolio of digital items. In some embodiments, this request 140 for a copy of the digital item may take many forms, such as selection and/or dragging of items from the interactive view of the portfolio of digital items into the second application, an @mention from the second application, and the like. For example, if a user types in an @mention in the team chat 510 which references the portfolio of digital items 530 and the particular digital item 550 to add to the team chat, that @mention may be parsed and replaced with text, such as text line B-D 560 and placed within the team chat 510.

In some embodiments, the digital portfolio application is running separately from the second application, and any other applications running on the computing device(s). As a user transitions from the first application to the second application and any other applications running on that device, the interactive view of the portfolio of digital items may remain active and within view on the display of the device. In some embodiments, this is advantageous because the portfolio of digital items will always be available to add items to the portfolio of digital items and/or use items from the portfolio of digital items in that application.

After the second application has requested 140 a copy of the digital item, the digital portfolio application may provide 150 a digital copy of the particular item in response to the request 140. As discussed above, this copy of the digital item may be provided in any appropriate way, including, via API, via FTP, over a digital stream such as TCP/IP, UDP, SSL, HTTP(S), et cetera. After the digital portfolio application has provided 150 the digital copy in response to the original request 140, the second application can receive 160 the requested digital copy for use in the second application. Once received, in some embodiments, the second application can use the digital item in any appropriate manner. For example, if the digital item is an image, that image may be pasted into an electronic document, used in a chat room, and the like. Received 160 text may be used in a document, in a chat room, or in any other appropriate manner.

In some embodiments, the received 160 digital copy will remain immutable regardless of the changing and/or deletion of the item from the portfolio of digital items. In other embodiments, when the item from the portfolio of digital items is changed and/or deleted, the copy in the second application that had been received 160 will similarly be changed and/or be removed or deleted in the receiving 160 application based on the change in the underlying digital item in the portfolio of digital items.

Using the techniques herein, a user may be able to receive digital items from multiple applications and/or multiple users. All of these digital items are in one easy-to-use place and can be provided to, and/or used in multiple applications. Additionally, users can share access to their portfolio of digital items, or send a copy of the portfolio of digital items. This may allow for much more efficient use of a wide array of digital items in multiple applications. This is the case both for a single user account, and for multiple user accounts. For example, a team may use a single portfolio of digital items in order to share, in one collaborative space, digital items useful to the entire team. A single user may also have his or her own portfolio of digital items. When a new user joins a team, an existing user may provide that new user access to and/or a copy of his or her portfolio of digital items in order to give that person a quick head start on the appropriate digital items to be using for the work with the team.

Not depicted in FIG. 1, interactions with the portfolio of digital items may also include modification of a digital item and/or deletion of a digital item in the portfolio of digital items. For example, in some embodiments, user interactions or commands may modify digital items in the portfolio of digital items. This may include the use of a text editor to modify the text of digital items in the portfolio of digital items; use of an image manipulation program to modify digital images in the portfolio of digital items; and the like. In some embodiments, an application can modify a digital item by replacing the digital item. For example, using techniques similar to those described herein, a digital item may be dragged, emailed, etc., along with an indication that it is to replace an existing digital item. In some embodiments, the digital portfolio application can receive commands (e.g., via the interactive display of the portfolio of digital items) that can delete or remove one or more digital items from the portfolio of digital items.

Figure 8:
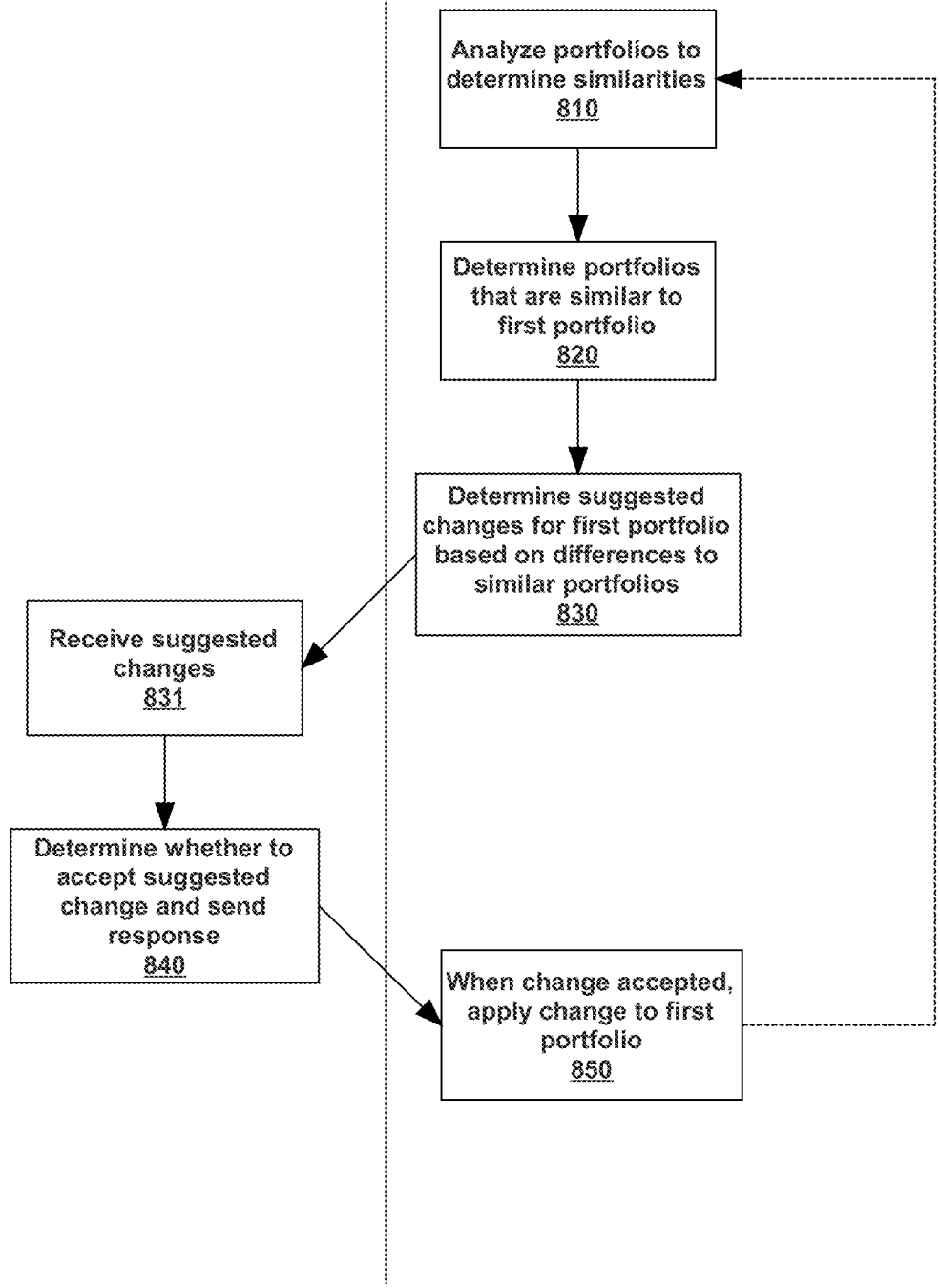
FIG. 8 is a flow diagram depicting a process for automated suggestions for cross-context digital item containers and collaboration.

FIG. 8 is a flow diagram depicting a process 800 for automated suggestions for cross-context digital item containers and collaboration. Process 800 begins by analyzing 810 portfolios of digital items to determine similarities among those portfolios. In some embodiments, the analysis 810 to determine the similarity between any two portfolios of digital items may include determining whether the two portfolios have identical or similar items. For example, if two portfolios of digital items each contain the same documents, pointers to documents, images, spreadsheets, videos, and/or the like, then those two documents may be seen as similar. In some embodiments, even if two portfolios of digital items have different links but those links point to similar or identical documents, that will increase the similarity of those two portfolios of digital items. In some embodiments, the digital items are analyzed in order to aid in the determination of similarity. For example, non-identical documents on the same topic may increase the similarity between the two portfolios of digital items containing those documents. In some embodiments, image recognition to determine similarity among various images. For example, images of dogs may be recorded as such in metadata based on recognizing dogs in those images. That metadata may be used to help determine the similarities between portfolios of digital items. For example, two portfolios of digital items each of which have pictures of dogs in them may be categorized as similar even of the images of those dogs are not identical. Various techniques or software packages may be used for image recognition, including Open Detection, Pastec, and/or Luminoth.

In some embodiments, the content of text documents is determined and stored as metadata in order to aid in the determination of the similarity of portfolios of digital items. For example, two documents that are not identical but are each about a particular machine learning algorithm may each be categorized as pertaining to that particular machine learning algorithm, and metadata indicating the subject of the document may be stored with relation to the document. When two documents pertain to the same machine learning algorithm, the existence of those two documents in two different portfolios of digital items may increase the similarity of those two digital portfolios of digital items. Relatedly, in some embodiments, documents may be vectorized and that vector may be compared. For example, a text vector of word occurrence of two documents may be compared in order to determine the similarity of those documents. Two documents with similar word occurrence may be seen as similar and increase the similarity metric for the portfolios of digital items that contain them. Further, in some embodiments, word rewriting, or word replacement may be used when different phrases or words may be used referring to the same item or concept. For example, Mount Tamalpais, Mount Tam, and Tam may all refer to a mountain in Northern California. As such, all of those may refer to the same concept and the occurrence of any of those three may be seen as the occurrence of the concept in a document. Therefore, any occurrence of the concept may be used to increase the similarity of two documents, and therefore the similarity of portfolios of digital items containing those terms.

Numerous techniques can be used in the analysis 810 to determine the similarities among portfolios. For example, collaborative filtering may be used in order to determine the similarity of multiple portfolios of digital items. In various embodiments, collaborative filtering utilizes information from the portfolios (e.g., of users or entities) to determine the likelihood that a digital item will be of interest to the user associated with a particular portfolio of digital items. Collaborative filtering makes automatic predictions about the interest and the appropriateness of a digital item for a particular portfolio of digital items based on the inclusion of that digital item in other portfolios of digital items that are similar. For example, if a first portfolio of digital items shares many digital items with a second portfolio of digital items, then the first and second portfolios may be seen as similar. Therefore, the digital items not contained in one of the portfolios that are contained in the other portfolio may be suggested as potentially interesting. In some embodiments, a Jaccard index or similarity coefficient may be used to determine the similarity of two portfolios of digital items. The Jaccard similarity coefficient measures similarity between the two portfolios based on the size of the intersection (e.g., the number of shared digital items) between the two portfolios divided by the size of the union (e.g., the total number of unique digital items when the two portfolios are combined) of the two portfolios.

In some embodiments, if a particular portfolio of digital items has accepted suggestions of updates from a second portfolio of digital items, then as part of the analysis 810, the similarity of those two portfolios may be determined as higher. As such, changes from that second portfolio of digital items may be more likely to be suggested to the first portfolio of digital items, as described elsewhere herein.

Based on the analysis 810 of similarities among the portfolios, one or more similar portfolios of digital items in the multiple portfolios of digital items that are similar to the first portfolio of digital items may be determined 820. This determination 820 may be made based on the similarity as determined above. For example, the most similar one, two, ten, etc. portfolios of digital items as compared to the first portfolio of digital items may be determined 820. Based on those determined 820 most similar portfolios of digital items, one or more suggested changes to the portfolios of digital items may be determined 830. The determination 830 of suggested changes may be based on the differences between the first portfolio of digital items and one or more portfolios of digital items from the set. For example, documents or other digital items that are in the similar portfolios of digital items may be determined and provided and recorded as suggested changes for the first portfolio of digital items.

Not depicted in FIG. 8, in some embodiments, there two or more suggested changes are determined 830 for a first portfolio of digital items and these two or more changes may be ranked. The ranking may be based on a time stamp for each of the changes, with newer changes being ranked higher or lower. In some embodiments the similarity between the first portfolio and each of the at least two portfolios of digital items may be used to rank the changes associated with that similar portfolio. For example, if Portfolio A is the closest to the first portfolio of digital items the suggested change associated with Portfolio A may be ranked highest followed by the other suggested changes. In some embodiments, the suggested change may be the addition of a digital item, the alteration of a digital item, and/or the removal of a digital item from the first portfolio of digital items.

Once the suggested changes have been determined 830, then those suggested changes are sent to the first application, which then receives 831 the suggested changes. The sending and receiving 831 of the suggested changes may take any appropriate form, including a call to an API, a remote procedure call, communications sent via HTTP, HTTPS, TTP/IP, and any another appropriate communication mechanism. For example, turning to FIG. 2, the suggested changes may be sent via network 290 from a digital portfolio application 210 to the first application 230.

After the suggested changes have been received 831, a determination 840 is made whether to accept the suggested changes. For example, a user may be prompted via the first application with an interface such as interface 900 at FIG. 9. In interface 900 of FIG. 9, a portfolio inbox 910 depicts two potential changes to the portfolio. The strike through of Document A indicates the suggested deletion of that document from the portfolio. The underlining of Document D indicates the suggested addition of document D to the portfolio of digital items. In some embodiments, an accept button 960 can be clicked or selected in order to accept all of the changes suggested in the portfolio inbox. Similarly, a reject button 961 can be clicked or selected in order to reject all of the changes in the portfolio inbox 910. In some embodiments, not depicted in FIG. 9, each potential change (e.g., the deletion of Document A and addition of Document D) may each have accept and reject buttons, or other indicator allowing for acceptance or rejection of individual changes. In some embodiments, the portfolio of digital items 930 may include an indicator 950 that new suggestions have arrived. The indicator 950 may be a link, button, or the like that when selected will pop up the portfolio inbox 910. In some embodiments, all changes from a particular portfolio of digital item, such that of a friend, colleague, manager, influencer or the like may be accepted automatically. Further, all suggested changes to a particular portfolio of digital items may be accepted. As such, determining 840 whether to accept the suggested change would include automatically accepting the suggested changes in those instances.

After the determination 840 is made whether to accept the suggested change, a response is sent from the first application to the digital portfolio application indicating whether or not to accept the change. Sending the response may be performed by any appropriate mechanism including using an API, a remote procedure call, sending communications over HTTP, HTTPS, TCP/IP, and/or the like. For example, referring to FIG. 2, first application 230 may send the indication over network 290 to the digital portfolio application 210.

After receiving an indication whether to accept the suggested change, the digital portfolio of application acts on that indication. When a suggested change is accepted 850 that change is applied to the first portfolio of digital items. Applying that change to the first portfolio of digital items may include adding an item to the first portfolio of digital items, deleting an item from that portfolio, or altering an item from that portfolio. After a suggested change has been applied, the first portfolio of digital items will reflect that change. For example, if the suggestion to both add Document D and remove Document A were accepted, then the portfolio 930 in FIG. 9 would have Documents B, C, and D.

In some embodiments, not depicted in FIG. 8, accepting a suggested change may modify the similarity between the first portfolio and the portfolio from which the change came. For example, accepting a change from a particular portfolio on behalf of the first portfolio of digital items may indicate that those two portfolios are more similar, increasing the likelihood that changes from that portfolio will be suggested for the first portfolio in the future. Further, the fact that that change has now been made to the first portfolio of digital items may also increase the actual similarity of the two portfolios (e.g., because they now have a higher ratio of similar items), which may also cause the measurement of similarity between those two portfolios to increase. Similarly, also not depicted in FIG. 8, rejecting a suggested change may also indicate that two portfolios are more dissimilar, and in some embodiments, reduce the similarity as determined 820 in process 800.

In some embodiments, as indicated by the dotted line in FIG. 8, as the first portfolio of digital items and/or any of the portfolios of digital items are changed, a new analysis 810 may be performed to determine 820 portfolios that are similar to the first portfolio, and process 800 may again proceed from there. Further, in some embodiments, as indicated by the dotted line in FIG. 8, process 800 may run on a regular or irregular basis (e.g., hourly, daily, etc.).

The features of processes 100 and 800 are described as being performed by particular applications (e.g., the first application, second application, and digital portfolio application). Those application may run separately, each on one or more separate processors. In some embodiments, two or more of those applications may be logically within the same application, and may represent portions of that joint application.

Example Systems

FIG. 2 is a block diagram depicting a system for cross-context digital items containers and collaboration. As depicted in system 200, numerous electronic devices 210-241 are all connected to a network 290. The network 290 may be the Internet, an intranet, a wide area network, a local area network, and/or any other type of network, such as those described herein. Digital portfolio application 210 is connected to network 290. The digital portfolio application 210 may perform, for example, the features 111-150 depicted in process 100 and/or 810-830, 850 of process 800 may being performed by a digital portfolio application. The first application 230 and second application 231 may also be connected to network 290. User devices 220-223 may also be connected to network 290 as well as storage modules 240-241. In some embodiments, the first application 230 and second application 231 may execute portions of processes 100 and/or 800 in order to interact with a portfolio of digital items being managed by the digital portfolio application 210. In some embodiments, the digital portfolio application 210 has its own storage and stores thereon the portfolio of digital items. In some embodiments, storage 240 and/or 241 may store the portfolio of digital items, a copy of the portfolio of digital items, and/or one or more portfolio of digital items associated with one or more users.

Example Interfaces

FIG. 4 depicts an example user interface for automated suggestions for cross-context digital item containers and collaboration. In some embodiments, application 410 allows for user selection 420 of text lines B-C. These texts line B-C 420 may be dragged into the portfolio of digital items 430 and copied there in 450. As described elsewhere herein, the portfolio of digital items 430 may also have existing digital items, such as images 440.

Figure 5:
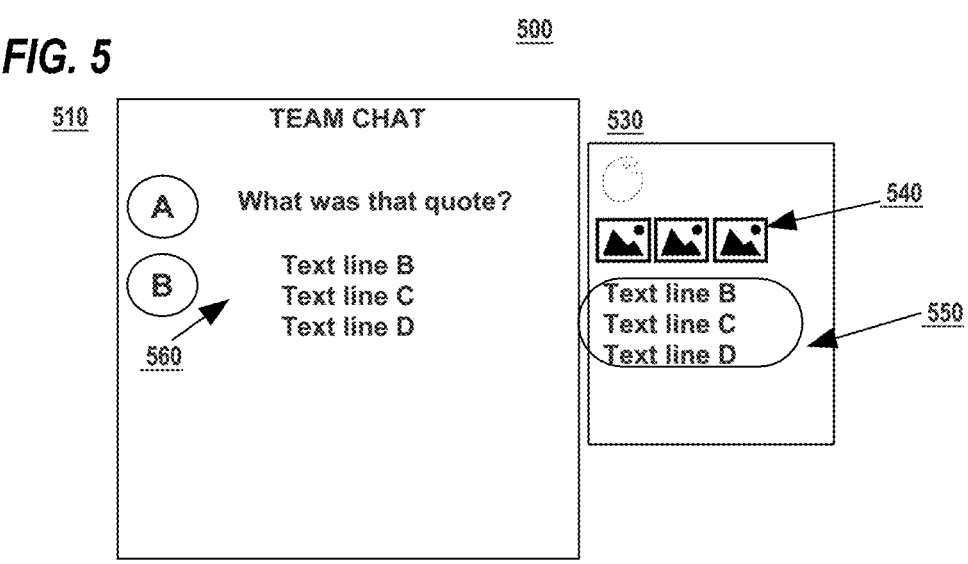
FIG. 5 depicts a second example user interface for automated suggestions for cross-context digital item containers and collaboration.

FIG. 5 depicts a second example user interface for cross-context digital items containers and collaboration. In a second application 510, such as a team chat user A may interact with other users in the team chat and ask for particular text. User B may then select items 550 from the portfolio of digital items and place them within the team chat using the techniques herein. For example, text lines B-D 550 may be selected from the portfolio of digital items 530 and thereby placed within the team chat as copies of the text lines B-D 560.

Figure 6:
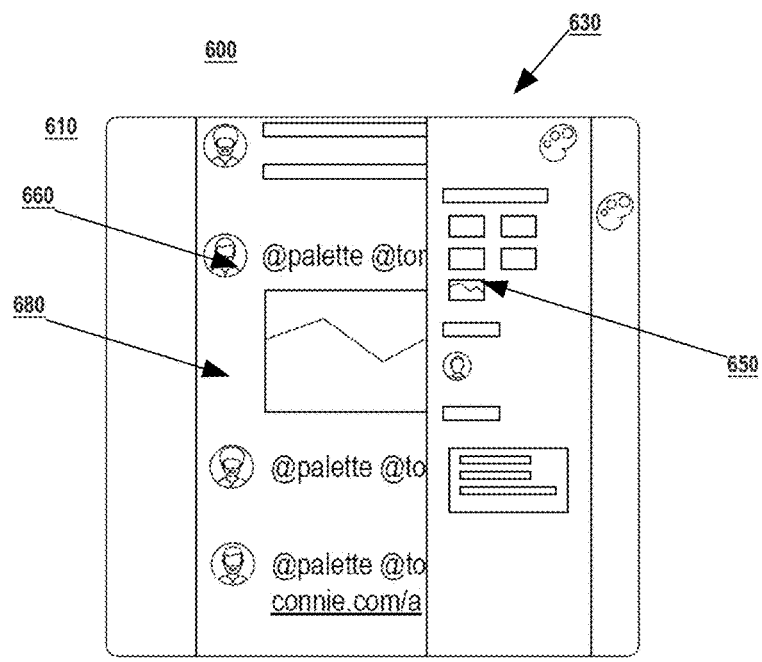
FIG. 6 depicts a third example user interface for automated suggestions for cross-context digital item containers and collaboration.

FIG. 6 depicts a user interface 600 with a chat program 610 open, as well as a portfolio of digital items 630 according to an embodiment of the techniques herein. In the chat program 610, the user has typed text 660 including "@palette" with an indicator to insert graphic 650 from the portfolio of digital items 630 into the chat program 610. Using the techniques herein, the graphic is inserted as graphic 680 into the chat program 610.

Figure 7:
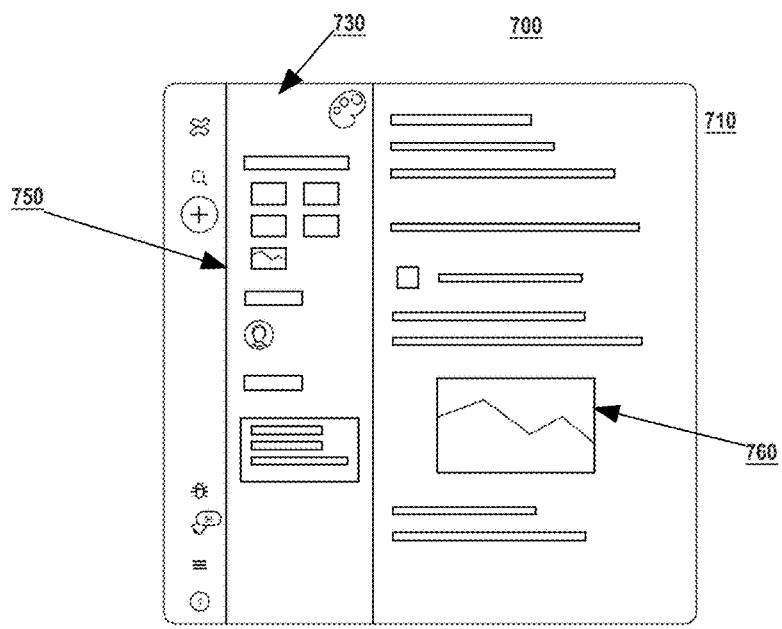
FIG. 7 depicts a fourth example user interface for automated suggestions for cross-context digital item containers and collaboration.

FIG. 7 depicts a user interface 700 including the interface for a document editor 710 and a portfolio of digital items 730. Using the techniques herein, the system allows the user, without navigating away from the document editor 710 to select digital item 730 (in this case an image) to be inserted into the document as image 760.

Figure 9:
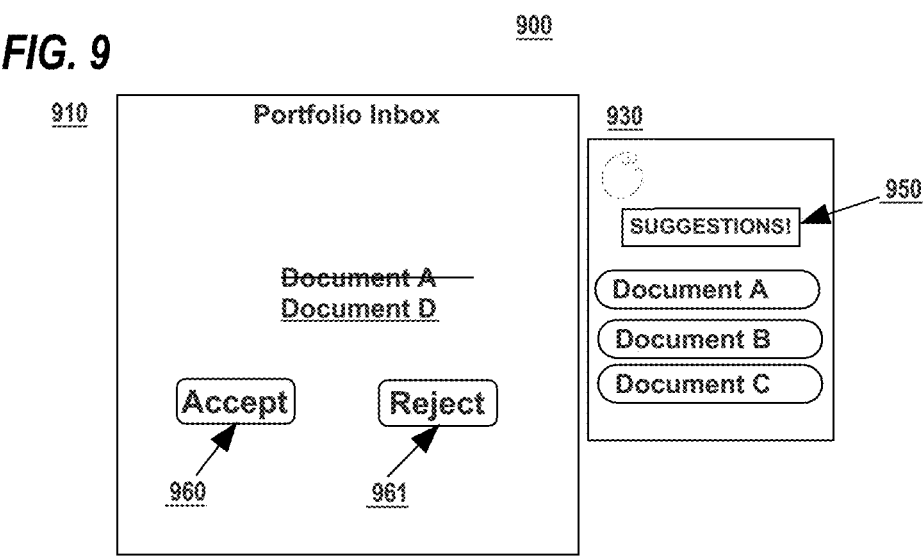
FIG. 9 depicts a fifth example user interface for automated suggestions for cross-context digital item containers and collaboration.

FIG. 9 depicts an interface 900 for presentation of and accepting and rejecting suggested changes for a portfolio of digital items. Portfolio 930 includes three documents, Document A, Document B, and Document C. It also contains an indication 950 that new suggestions of digital items are available for the portfolio 930. As discussed elsewhere herein, the indication 950 may be a button, link, or any other appropriate indication. When a user selects or otherwise indicates that he or she would like to see the suggestions by selecting indicator 950 then a portfolio inbox 910 is displayed with the suggestions. The portfolio inbox 910 shows that Document A would be deleted in one suggestion and that Document D would be added to portfolio 930 in another suggestion. An accept button 960 and reject button 961 are displayed as part of the portfolio inbox 910. Clicking the accept button 960 would accept both the deletion of Document A and the addition of Document D to portfolio 930. Similarly, the clicking of the reject button 961 would ignore or reject both suggested changes. In some embodiments, as depicted in FIG. 9, all suggestions can be accepted or rejected simultaneously. In other embodiments, each suggested change may be individually accepted or rejected, as such each suggested change would have its own accept button 960 or reject button 961. Further, in some embodiments, other means of accepting and rejecting changes may be used other than accept button 960 and reject button 961. For example, right clicking on the suggested changes may cause to appear a menu allowing you to accept or reject each change individually. Other techniques may also be used.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
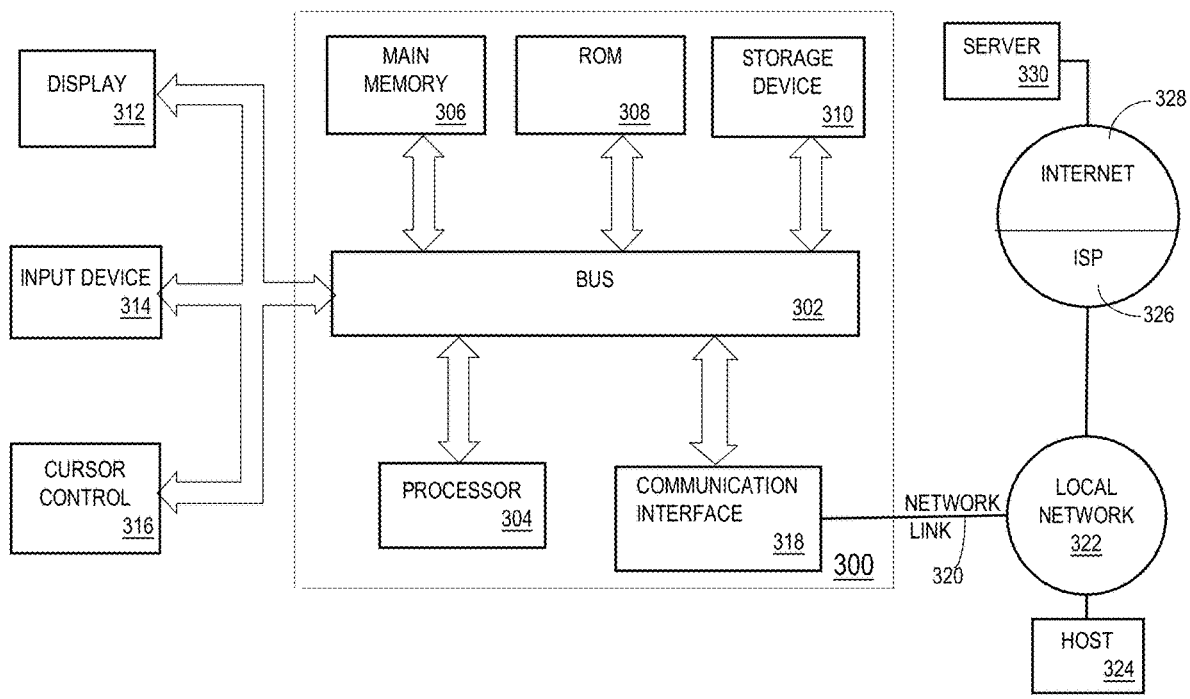
FIG. 3 depicts example hardware for automated suggestions for cross-context digital item containers and collaboration.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services.

Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer implemented method for executing a digital portfolio application on one or more computing devices linked by a communications network, the method comprising:

analyzing first digital items contained in a first portfolio;

analyzing a first content of the first digital items to generate a first set of metadata;

analyzing a respective content of respective digital items of each of a set of portfolios to generate a respective set of metadata;

determining a set of similarity metrics, each similarity metric in the set of similarity metrics being between the first portfolio and a respective portfolio in the set of portfolios and determined by comparing the first set of metadata to the respective set of metadata;

using the set of similarity metrics, identifying a subset of portfolios from the set of portfolios that meet a similarity criteria with respect to the first portfolio;

determining a ranked list of suggested changes to the first portfolio based on a difference between the first digital items and digital items contained in the subset of portfolios, wherein an order of suggested changes is based on the similarity metric between the first portfolio and each respective portfolio in the subset of portfolios;

sending the ranked list of suggested changes to a first application associated with the first portfolio;

receiving, from the first application, an indication of whether to accept one or more of the ranked list of suggested changes; and in response to one or more of the ranked list of suggested changes being selected, applying the accepted one or more of the ranked list of suggested changes to the first portfolio.

2. The computer implemented method of claim 1, wherein determining the ranked list of suggested changes comprises:

using the set of similarity metrics, determining a most similar portfolio to the first portfolio from the subset of portfolios; and suggested changes that are based on a difference between the most similar portfolio and the first portfolio are ranked higher than changes based on other portfolios in the subset of portfolios.

3. The computer implemented method of claim 1, wherein sending the ranked list of suggested changes to the first application causes the suggested changes to be displayed based on the order of the suggested changes.

4. The computer implemented method of claim 1, wherein determining each similarity metric in the set of similarity metrics is further based on an intersection and union of the first portfolio to the respective portfolio in the set of portfolios, a similarity of content between the first portfolio and the respective portfolio in the set of portfolios, a similarity of content pointed to by the first portfolio to the respective portfolio in the set of portfolios, or a combination thereof.

5. The computer implemented method of claim 1, wherein determining the set of similarity metrics further comprises creating a collaborative filtering record.

6. The computer implemented method of claim 1, wherein determining the set of similarity metrics further comprises determining that a digital item contained in the respective portfolio of the set of portfolios was previously copied from the respective portfolio and to the first portfolio.

7. The computer implemented method of claim 1, wherein the ranked list of suggested changes comprises at least one of an addition of a digital item to the first portfolio, a deletion of a digital item from the first portfolio, or alteration of a digital item contained in the first portfolio.

8. The computer implemented method of claim 1, wherein the first application automatically accepts changes included in the ranked list of suggested changes.

9. The computer implemented method of claim 1, wherein:
the first set of metadata indicates a subject related to the first content; and
the respective set of metadata indicates a subject related to the respective content.

10. A computer implemented method for executing a digital portfolio application on one or more computing devices linked by a communications network, the method comprising:
analyzing first digital items contained in a first portfolio;
analyzing a first content of the first digital items to generate a first set of metadata;
analyzing a respective content of respective digital items of each of a set of portfolios to generate a respective set of metadata;
determining a set of similarity metrics, each similarity metric in the set of similarity metrics being between the first portfolio and a respective portfolio in the set of portfolios and determined by comparing the first set of metadata to the respective set of metadata;
using the set of similarity metrics, determining a ranked list of portfolios based on a similarity of each portfolio in the set of portfolios to the first portfolio;
identifying a subset of the portfolios from the ranked list of portfolios; and
sending a ranked list of suggested changes to a first application associated with the first portfolio, wherein the an order of changes in the ranked list of suggested changes is based on the similarity metric between the first portfolio and the respective portfolio in the subset of portfolios.

11. The computer implemented method of claim 10, wherein the ranked list of suggested changes includes respective digital items from the subset of portfolios that are not included in the first digital items.

12. The computer implemented method of claim 10, further comprising:
receiving, from the first application, an indication of whether to accept one or more of the ranked list of suggested changes; and
in response to one or more of the ranked list of suggested changes being selected, applying the accepted one or more of the ranked list of suggested changes to the first portfolio.

13. The computer implemented method of claim 10, wherein a first suggested change in the ranked list of suggested changes comprises a digital item from a first ranked portfolio in the ranked list of portfolios.

14. The computer implemented method of claim 10, wherein determining each similarity metric in the set of similarity metrics is further based on an intersection and union of the first portfolio to the respective portfolio in the set of portfolios.

15. The computer implemented method of claim 10, wherein determining each similarity metric in the set of similarity metrics is further based on a similarity of content between the first portfolio and the respective portfolio in the set of portfolios.

16. The computer implemented method of claim 10, wherein determining each similarity metric in the set of similarity metrics is further based on a similarity of content pointed to by the first portfolio to the respective portfolio in the set of portfolios.

17. A computer implemented method for identifying changes to a digital portfolio application executing on one or more computing devices linked by a communications network, the method comprising:
analyzing first digital items contained in a first portfolio;
analyzing a first content of the first digital items to generate a first set of metadata;
analyzing a respective content of respective digital items of each of a set of portfolios to generate a respective set of metadata;
determining a set of similarity metrics, each similarity metric in the set of similarity metrics being between the first portfolio and a respective portfolio in the set of portfolios and determined by comparing the first set of metadata to the respective set of metadata;
using the set of similarity metrics, identifying a subset of portfolios from the set of portfolios that meet a similarity criteria with respect to the first portfolio;
determining a suggested change to the first portfolio based on the similarity metric between the first portfolio and each respective portfolio in the subset of portfolios; and
sending the suggested change to a first application associated with the first portfolio.

18. The computer implemented method of claim 17, wherein:
the suggested change is a first suggested change; and
the method further comprises determining a second suggested change to the first portfolio based on the similarity metric between the first portfolio and each respective portfolio in the subset of portfolios.

19. The computer implemented method of claim 18, further comprising determining an order of first and second suggested changes based on the similarity metric between the first portfolio and each respective portfolio in the subset of portfolios.

20. The computer implemented method of claim 17, further comprising:
receiving, from the first application, an indication of whether to accept the suggested change; and
in response to the suggested change being selected, applying the accepted change to the first portfolio.

* * * * *